Figure 1:
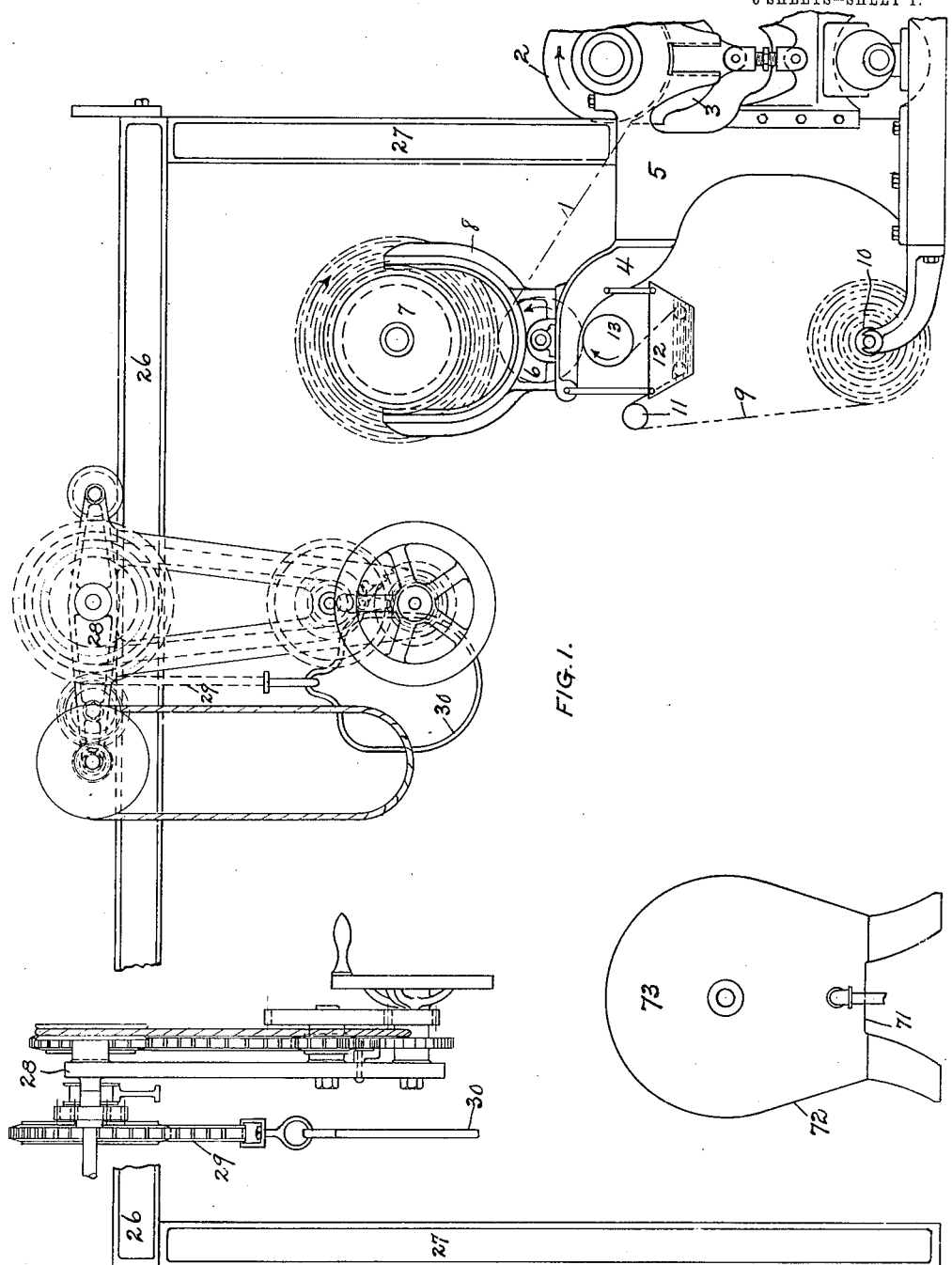

D. GESSNER.
METHOD OF TREATING CLOTH.
APPLICATION FILED JULY 31, 1905.

946,915.

Patented Jan. 18, 1910.
6 SHEETS—SHEET 1.

WITNESSES:

INVENTOR:

D. GESSNER.
METHOD OF TREATING CLOTH.
APPLICATION FILED JULY 31, 1905.
946,915.
Patented Jan. 18, 1910.
6 SHEETS—SHEET 2.
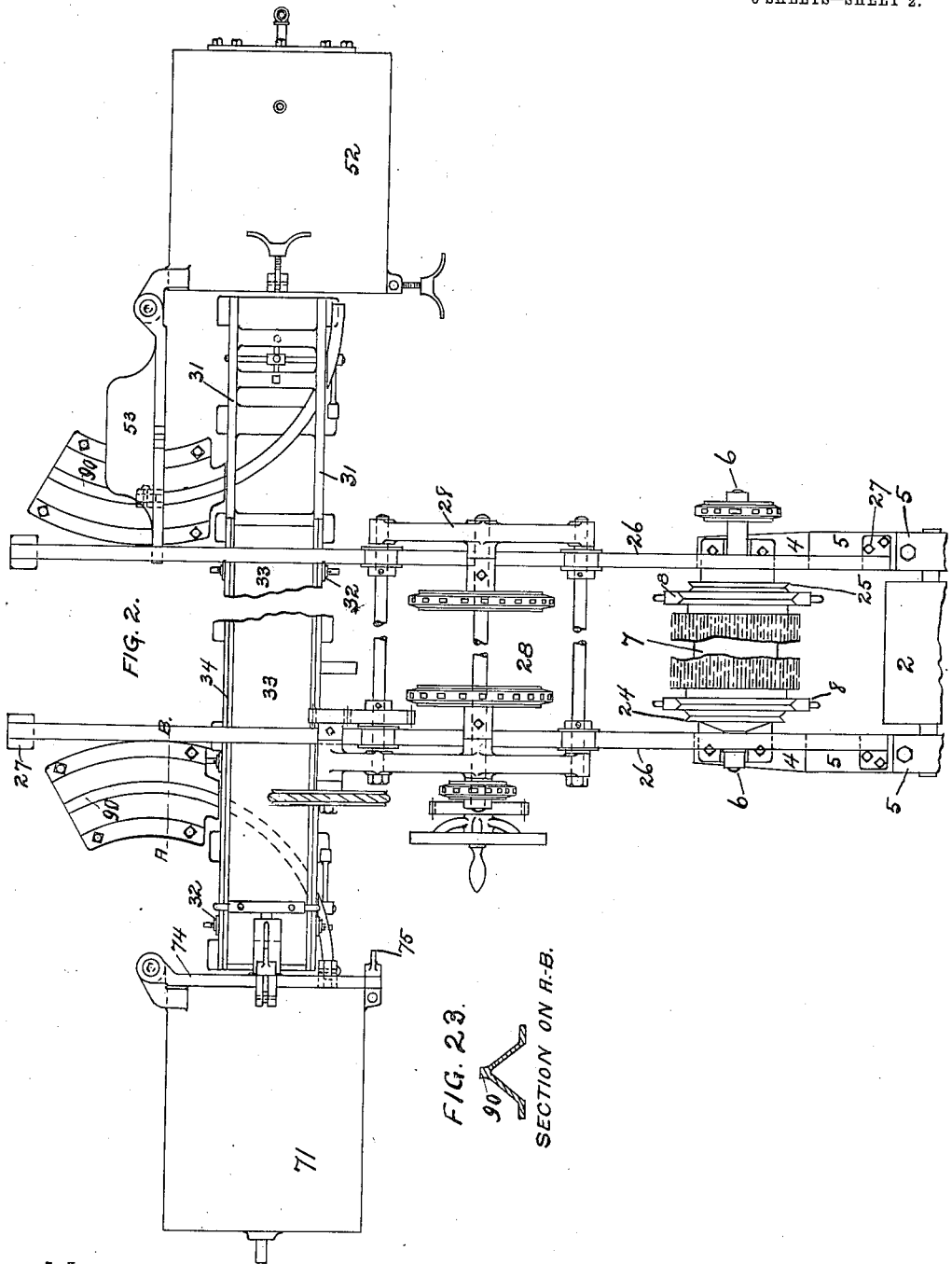
WITNESSES:
R. B. Cavanagh
Walter Van Court
INVENTOR:
David Gessner
by Gifford & Bull ATT'Y.

D. GESSNER.
METHOD OF TREATING CLOTH.
APPLICATION FILED JULY 31, 1905.
946,915.
Patented Jan. 18, 1910.
6 SHEETS—SHEET 3.
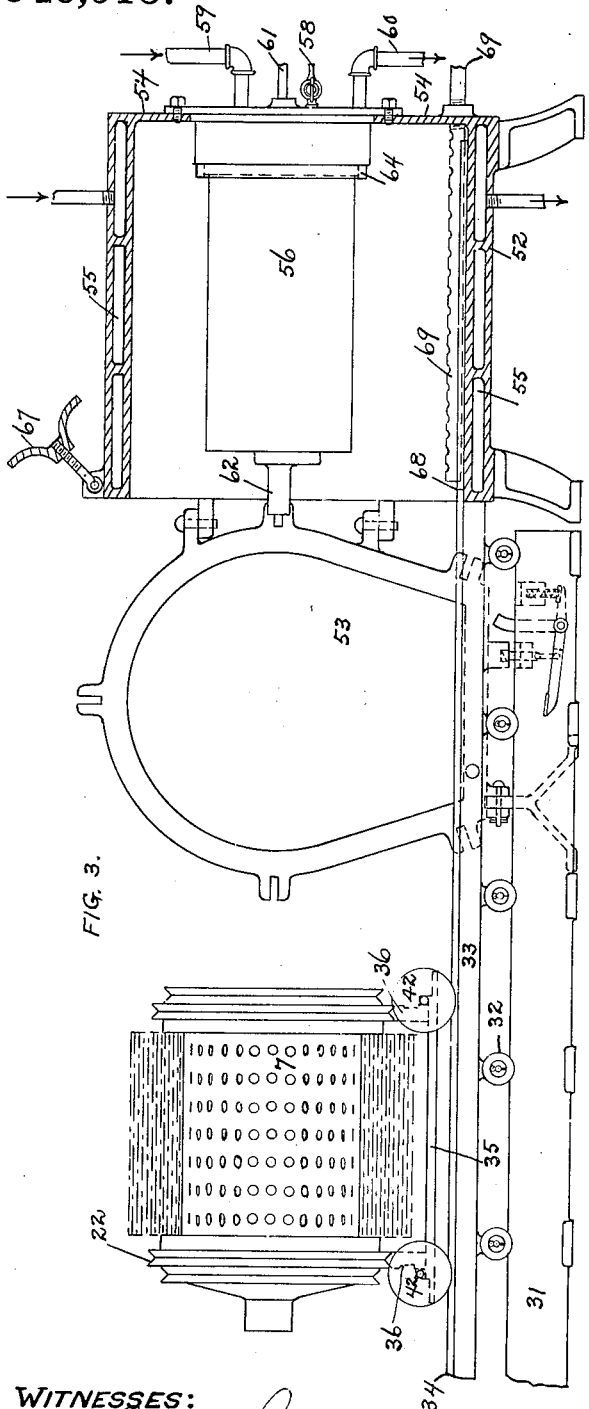
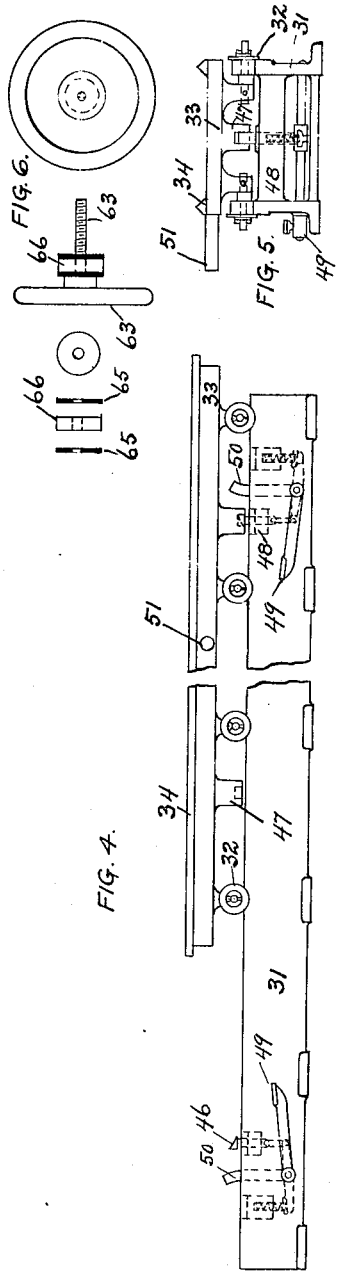

D. GESSNER.
METHOD OF TREATING CLOTH.
APPLICATION FILED JULY 31, 1905.
946,915.
Patented Jan. 18, 1910.
6 SHEETS—SHEET 4.
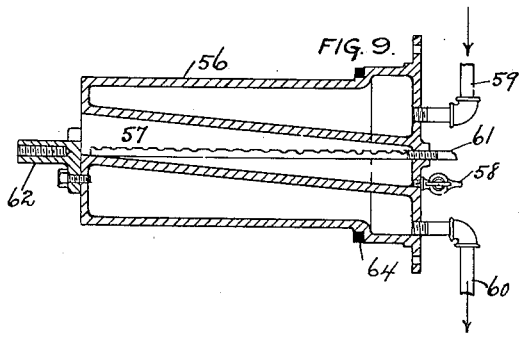
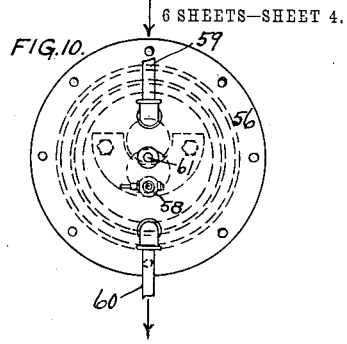
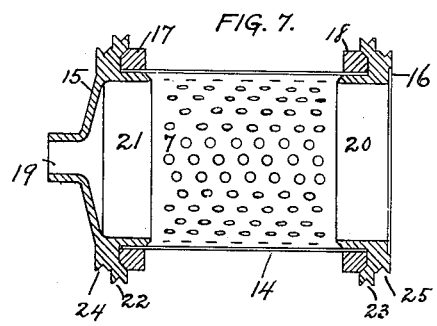
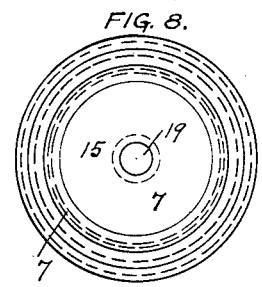
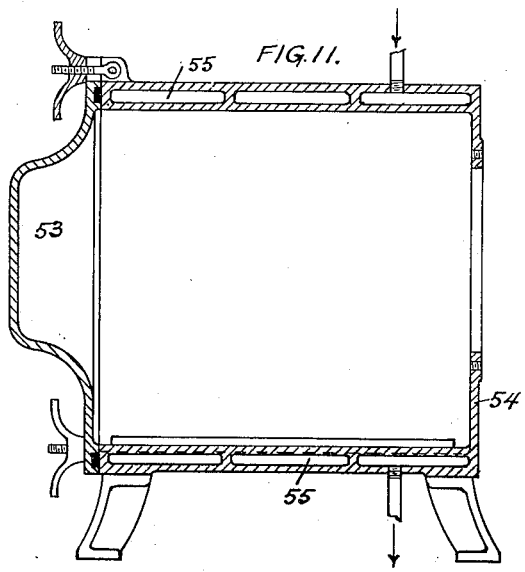
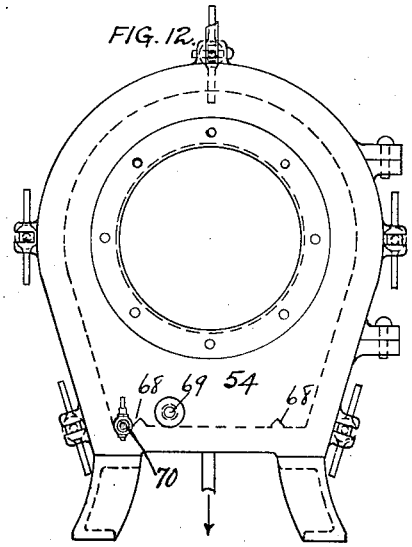
WITNESSES:
R. B. Cavanagh
Walter Van Court
INVENTOR:
David Gessner
by Gifford & Bull ATTY.

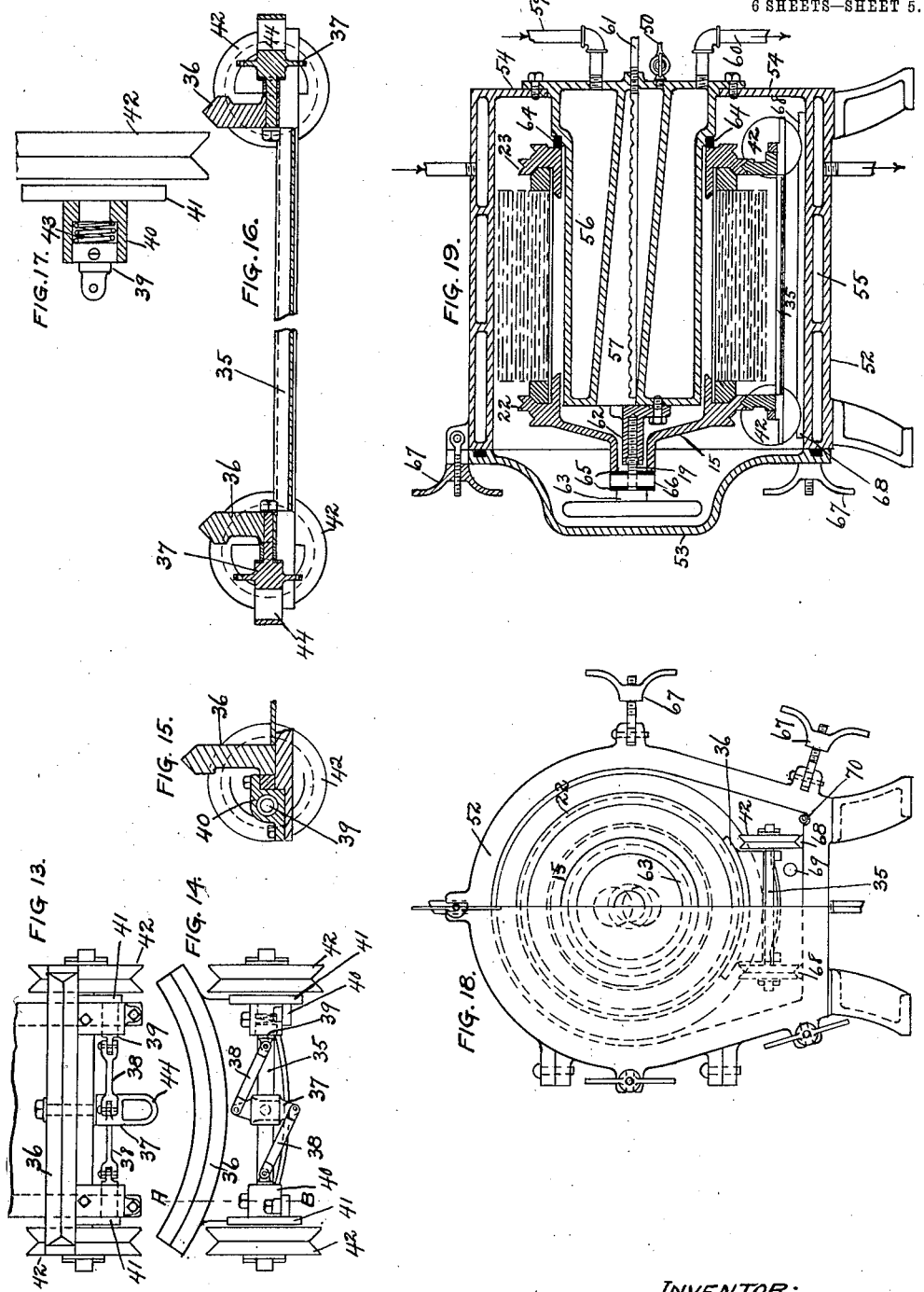

D. GESSNER.
METHOD OF TREATING CLOTH.
APPLICATION FILED JULY 31, 1905.
946,915.
Patented Jan. 18, 1910.
6 SHEETS—SHEET 6.
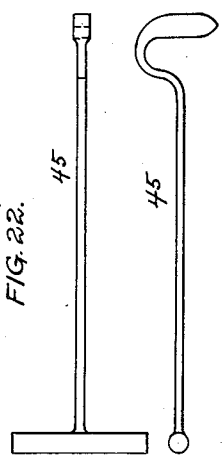
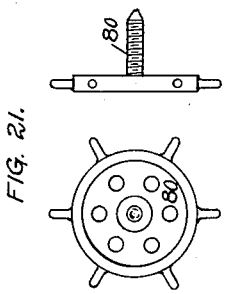
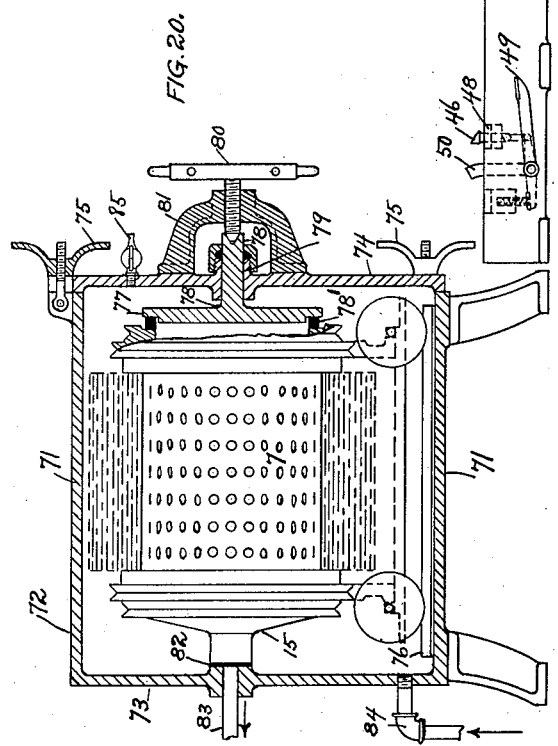
WITNESSES:
R. B. Cavanagh.
Walter Van Court.
INVENTOR;
David Gessner
by Gifford & Bull ATT'Y.

UNITED STATES PATENT OFFICE.

DAVID GESSNER, OF WORCESTER, MASSACHUSETTS.

METHOD OF TREATING CLOTH.

946,915.  Specification of Letters Patent.  Patented Jan. 18, 1910.

Application filed July 31, 1905. Serial No. 272,122.

*To all whom it may concern:*

Be it known that I, DAVID GESSNER, a citizen of the United States, and a resident of Worcester, in the county of Worcester and State of Massachusetts, have invented a new and useful Improvement in Methods of Treating Cloth, of which the following is a specification.

Heretofore, many attempts have been made to impart to cloth in a permanent manner the qualities that have heretofore been given to it by hand operations. The general object of my present invention is in the same direction, but my present invention supplies a comprehensive system which is not only a new conception in its entirety, but contains many parts or steps which constitute conceptions severally as well as being components of the whole.

Heretofore it has sometimes been the custom in the use of cloth presses to deliver the cloth from the press by rolling it upon a lap-roll while under its pressing heat; that is to say, the heat imparted to it by the two hot surfaces between which it is pressed. But before subjecting the cloth to further operations, it has been customary to unroll it from this lap-roll. The pressing imparts to the cloth a peculiarly lustrous finish and firm handle or substance which it retains when in the roll formed by it under its pressing heat immediately as it is delivered from the press. The manner of subsequent treatment heretofore applied to it, however, has tended to impair or destroy those qualities and one of the principal objects of my present invention is to render those qualities in a large measure fixed and permanent, not only substantially retaining them until the cloth leaves the mill, but even rendering them so permanent that they are retained by the cloth notwithstanding wear and exposures to atmospheric conditions in ordinary use.

My process may therefore be divided into three parts: first, the imparting to the cloth of the qualities incident to the use of the press as above referred to; second, the retaining of those qualities by keeping it in the roll in which it is formed under the pressing heat pending its arrival at the third part of the process; and third, a treatment by which those qualities in a large measure are rendered so fixed and permanent that they will be retained by the cloth not merely when it is unrolled, but afterward.

In the accompanying drawings, I have shown an apparatus by which my new system may be carried into effect.

Figure 1 is an elevation of the apparatus in general. Fig. 2 is a plan view of the same with some additions not shown in end view in Fig. 1. Figs. 3 to 22 are details.

In my general system which I am about to describe the cloth during the later steps of its treatment is retained in the same roll in which it is formed while in the press, and although there are certain parts or steps of my invention which may be employed without this feature and which I therefore desire to claim without limitation thereto, nevertheless this feature is of so much importance to the quality of the cloth obtained by the succeeding steps that I will describe the general invention under the following divisions: 1. The pressing of the cloth and forming it into a roll. 2. The transfer of this roll to the steamer. 3. The steamer. 4. The cooler. 5. The transfer of the roll from the steamer to the cooler The pressing of the cloth and forming it into a roll is accomplished as follows: The cloth 1 is pressed between a cylinder 2 and a bed-plate 3 which will be recognized as the ordinary steam heated cylinder and steam heated bed plate of a well known rotary press and which may be constructed and operated substantially as described in my Letters Patent No. 565072 dated August 4, 1896, and which therefore require no further description. The bracket 4 of the press-frame 5 carries the delivery roll 6 upon which rests the steamer-cylinder 7 which is held between the vertical guide-ways of the fork 8 so that it can rise as the roll of cloth accumulates upon it. I term the part 7 upon which the cloth is rolled the steamer-cylinder to distinguish it from the ordinary wooden lap-roll upon which, so far as I know, it has been the universal custom to roll or wind the cloth on a rotary press; the part 7 being the identical roll upon which the cloth remains during its subsequent treatments, inclusive of steaming, whether such steaming be accomplished by added steam or by steam produced from the heating of the moisture rolled up with the cloth.

9 is a nonendless apron which may be employed for winding up with the cloth. This apron may start from the roll 10 and pass over the guide 11 and through water contained in the tank 12 and around the guide 13 and the delivery roll 6, joining the cloth upon the delivery roll 6, and being wound up spirally therewith on the steamer-cylinder 7. I, however, do not wish to limit myself unless so expressed in the claims, to the use of this apron since in some work I intend that it should be dispensed with.

The steamer cylinder 7 consists, as shown in longitudinal section in Fig. 7, of a perforated shell 14 bound to the two heads 15 and 16 by the shrunken rings 17 and 18. The head 15 is convex, containing the central opening 19. The head 16 contains an opening 20 as large as is permitted by the shell 14; said opening being in axial alinement and of the same diameter with the opening 21 in the head 15 so as to admit of a free passage within the cylinder 7 of the apparatus hereinafter referred to. On the periphery of the head 15 is formed a groove 22 and on the periphery of the head 16 a groove 23, which grooves fit the guideways of the fork 8. Outside of these grooves are the grooves 24 and 25 to receive the stirrups of the trolley next described.

The transfer of the cloth roll to the steamer may be accomplished by the following mechanism. 26 are overhead rails extending transversely above the steamer-roll 7 and supported at each end by the posts 27. Upon these rails runs a trolley 28 carrying suitable hoisting mechanism, from the fall 29 of which are pendent the stirrups 30 adapted, respectively, to slip over the heads of the steamer-roll 7 and engage the grooves 24 and 25 thereon and lift the steamer-roll 7 out of the fork 8. Beneath the opposite ends of the overhead rails 26 are laid transversely the rails 31 upon which run the wheels 32 carrying the table 33 carrying the rails 34 upon which run the truck 35, shown in detail in Figs. 13–17 hereinafter more particularly described. Upon opposite ends of the truck are mounted the uprights 36, the tops of which are curved and V-shaped so as to fit the grooves 22 and 23 on the heads of the steamer cylinder 7.

The hoisting mechanism upon the trolley 28 having raised the steamer-cylinder 7 from the press, carries it into position over the truck 35 and lowers it down upon the uprights 36 of that truck by which it is held in exact axial alinement with the steamer and cooler, hereinafter referred to.

The table and truck are provided with mechanism whereby the table may be moved longitudinally so as to provide a trackway for the truck into either the steamer or the cooler, or whereby the truck may be permitted to run upon the table into either the steamer or the cooler. This mechanism may be as follows: 37 is a rocker pivoted to the truck and connected at its opposite extremities by the links 38, 38, with the plungers 39 guided by the sleeves 40 for carrying the friction-plates 41, forming a friction clutch with the face of the truck wheels 42. 43 are springs constantly tending to disengage the friction surfaces. 44 is an eye in one piece with the rocker 37. By engaging a suitable hook 45, shown in detail in Fig. 22 with this eye, the operator may turn the rocker 37 so as to throw the friction surfaces into engagement and frictionally lock the truck wheels against movement along the table. When the truck wheels are thus locked by a mere twist of the hook and a push is exerted on the hook against the truck, the table and the truck will be moved together either toward the steamer or the cooler, as may be desired. When, however, the hook is not twisted, the springs 43 will disengage the friction surfaces and unlock the truck wheels so that the operator may shove the truck back and forth upon the table at will. In order to hold the table during the movements of the truck upon it, I provide spring latches 46 projecting upward from the stationary track and engaging with a downward projection 47 from the bottom of the table. These latches are mounted in guideways in the cross-ties 48 between the rails 31 and can be withdrawn by means of the foot-levers 49. The bevels of the two latches are so directed that when the table is shoved toward one end of the track one of the latches will automatically engage it and retain it until unlatched by the foot-lever. The other latch performs the same function when the table is moved to the other end of the track. Connected with each foot-lever 49 is also an arm 50 which acts as a starter for the table which, by the same movement of foot-lever that unlatches the latch is brought in contact with the projection 47 in the table so as to shove the table and give it a start toward the opposite end of the trackway. 51 is a pin projecting from the side of the table by which the operator can push the table along to such position on the track as he may desire.

The steamer 52 is preferably of the following construction (see Figs. 3, 11, 12, 18, 19): It consists of a horseshoe shaped chest one end of which is closed by the suitably packed hinged door 53 and the opposite end by the head 54. It is peripherally jacketed by the steam jacket 55. The interior diameter of the circular portion of this steam chest is such as to receive the roll of cloth carried upon the steamer-cylinder 7. Secured to the head 54 and extending concentrically inward is a heating cylinder 56, (see Figs. 9, 10, 19) the diameter of which is such that as the steamer-cylinder 7 is brought upon its truck within the steamer, it surrounds the heating cylinder 56 which is in such position as to register within the openings 20 and 21 leaving a clearance for the passage of the steam all around the heating cylinder (see Fig. 19). This heater 56 is a hollow casting into which extends the opening 57 inclined downward from front to rear and provided with a cock 58 at the rear. Steam pipes 59 and 60 supply the circulation of steam necessary for heating. Into the opening 57 extends a steam pipe 61 which is perforated within said opening and serves to supply steaming steam, or for other purposes, as desired. 62 is an interiorly threaded stud mounted upon the forward end of the heater 56 and extending into the opening 19 in the steamer-cylinder 7. 63 is a hand screw adapted to bear upon the head 15 around the opening 19 and screwed into the end of the stud 62. A rubber gasket 64 is interposed as a packing between the forward end of the steamer-cylinder and a shoulder on the heating cylinder. The two rubber washers 65 and the metal washer 66 are interposed between the hand wheel and the head of the steamer-cylinder. By this construction, the tightening of the hand screw 63 will tighten the rubber packings above referred to and close all exit of steam from the inside of the steamer-cylinder excepting through the perforations in its periphery. 67 are nuts by which the door of the heater is held close. 68 are tracks upon the bottom of the steamer on which run the wheels of the truck. 69 is a steam pipe which projects into the steamer between said tracks and which is perforated within the steamer. 70 is a steam outlet provided with a pet-cock on the outside for the exit of steam or water from the steamer.

The cooler 71 (see Fig. 20) is a chest of the same form as the heater consisting of the horseshoe shaped periphery 72, the rear head 73 and the front door 74 closed by the handnuts 75 and a bottom track 76. 77 is a disk adapted to close the open end of the steamer-cylinder 7; a packing ring 78' being interposed. The disk 77 is carried by a plunger 78 that extends through a stuffing box 79 in the cooler door. Upon the outer end of the plunger impinges a hand screw 80 screw-threaded to the bracket 81 secured to the outer side of the door. 82 is a packing ring interposed between the opposite head of the steamer-cylinder and the head of the cooler. Thus, when the hand screw 80 is tightened the only outlet for the passage of air between the outside and the inside of the steamer-cylinder 7 is through the perforations in the periphery of the cylinder and the roll of cloth wound thereon. 83 is an exhaust pipe extending through the head of the cooler and opening into the interior of the steam-cylinder 7. A suitable suction-pump 4 will furnish the exhaust for the pipe 83. 84 is an air inlet into the interior of the cooler. 85 is another air inlet that may be employed, if desired, and which is controlled by a cock.

In Fig. 2, I have shown tracks 90, 90, which may be employed for supporting the heater and cooler doors as they swing open. A cross section of one of these tracks is shown in Fig. 23.

*The transfer of the cloth roll from the steamer to the cooler.*—In order that the truck may have a substantially continuous trackway into the steamer and also out of the steamer again and into the cooler, I extend the rails 34 at opposite ends of the table 33 so that when the table is caused to abut against either the heater or the cooler, the outward projection of its rails will abut against the ends of the rails in the bottom of the heater or the cooler, as the case may be, and as is shown in Fig. 3.

There are various ways in which the apparatus above described may be operated, depending upon the effect which it is desired to produce upon the cloth. Some of these ways I will now proceed to describe.

One way may be described as follows: In the press, the cloth is wound up spirally on the steamer-cylinder 7 in conjunction with the wet endless apron 9. In the steamer, no outside steam is applied to the cloth and it is subjected only to the steam produced by the evaporation of the water already contained within it and the apron. The heat for evaporating this water is applied interiorly from the steam circulating within the heating cylinder 56 and exteriorly from the steam within the steam jacket 55. After this evaporation has continued as long as desired, the vapor which has thus been evaporated into the space within the steamer outside of the cloth may be drawn back through the cloth by means of an exhaust applied to the pipe 61. All other openings into the heater are closed while this exhaust is in progress so that it tends to produce a vacuum within the heater. In the cooler, a draft of cold air is induced through the cloth by permitting cold air to enter the cooler through the pipe 84 and applying an exhaust to the pipe 83. By this means, the cloth is rapidly cooled so that its fibers are given the desired set.

Another way of operating is as follows: In the press, the cloth is wound up on the steamer cylinder in the dry condition in which it leaves the presser and without any wet apron, although a dry apron may or may not be present, as preferred. In the steamer, the roll of cloth is subjected not merely to heating, but also to steaming by wet steam admitted through the pipe 69 and exhausted through the pipe 61. At the same time that this steaming by wet steam is in progress, the cloth is subjected to heat by the heat applied interiorly from the heater 56 and exteriorly by the steam jacket 55, so as to prevent the steam from producing water spots. If any water should condense within the heater, it will accumulate at the bottom of the heater and be reëvaporated into steam. In the cooler the operation is as before. Another way may be described as follows: It is the same as the second way with the exception that in the heater, the live or steaming press is passed through the cloth in both directions—that is, from the exterior inward and from the interior outward, or vice versa. This is done, for example, by first supplying the steam through the pipe 69 and exhausting it through the pipe 61 and subsequently supplying it through the pipe 61 and exhausting through pipe 69. This produces a uniformity in the treatment of the cloth in all parts of the roll, both from end to end and from the inside out, greater than I believe has ever before been obtained.

In applying the live steam either from the inside or from the outside in either of the ways above mentioned, the steam supply may be under so little pressure as to require the exhaust for drawing it through the cloth or it may be supplied under such pressure that no exhaust will be necessary. Wherever the steam is supplied under such low pressure that the exhaust is necessary, I prefer to precede the supply of the steam by exhausting until a vacuum has been created by the exhaust within the steamer. Then, as soon as the steam supply is turned on, it will more quickly penetrate all the way through to the exhaust pipe.

The result of the above operation on the cloth is that it is given a finish and shrink which is similar to that heretofore given by hand finishing and shrinking operations but which is so set or permanent in its character as to largely prevent the cloth from being changed or affected either in finish or shape by the manipulation of the tailor or by use.

The apparatus that I employ for carrying out this process is to be made the subject of a divisional application hereof.

Having thus described my invention, I claim as new and desire to secure by Letters Patent,

1. The improvement in the art of treating cloth which consists in subjecting it to hot pressure between the opposed pressing surfaces of a cloth press, forming it into a roll while under its pressing heat and then without unwinding subjecting the roll to heating.

2. The improvement in the art of treating cloth which consists in subjecting it to hot pressure between the opposed pressing surfaces of a cloth press, forming it into a roll while under its pressing heat and then without unwinding subjecting the roll to heating applied in the interior of the roll.

3. The improvement in the art of treating cloth, which consists in subjecting it to hot pressure between the opposed pressing surfaces of a cloth press, forming it into a roll while under its pressing heat and then without unwinding subjecting the roll to heating applied in the interior and on the exterior of the roll.

4. The improvement in the art of treating cloth which consists in subjecting it to hot pressure between the opposed pressing surfaces of a cloth press, forming it under its pressing heat into a roll in conjunction with a wet apron and then without unwinding subjecting the roll to heat whereby the moisture contained in the apron is vaporized.

5. The improvement in the art of treating cloth which consists in subjecting it to hot pressure between the opposed pressing surfaces of a cloth press, forming it into a roll while under its pressing heat and then without unwinding subjecting the roll to steaming.

6. The improvement in the art of treating cloth which consists in subjecting it to hot pressure between the opposed pressing surfaces of a cloth press, forming it into a roll while under its pressing heat and then without unwinding subjecting the roll to a current of steam passed through the cloth from the interior of the roll outward.

7. The improvement in the art of treating cloth which consists in subjecting it to hot pressure between the opposed pressing surfaces of a cloth press, forming it into a roll while under its pressing heat and then without unwinding subjecting the roll to a current of steam passed through the cloth from the exterior of the roll inward.

8. The improvement in the art of treating cloth which consists in subjecting it to hot pressure between the opposed pressing surfaces of a cloth press, forming it into a roll while under its pressing heat and then without unwinding subjecting the roll to currents of steam passed through the cloth from the interior of the roll outward and vice versa.

9. The improvement in the art of treating cloth which consists in subjecting it to hot pressure between the opposed pressing surfaces of a cloth press, forming it into a roll while under its pressing heat and then without unwinding subjecting it to the passage of a current of steam and subsequently to the passage of a current of air.

10. The improvement in the art of treating cloth which consists in subjecting it to hot pressure between the opposed pressing surfaces of a cloth press, forming it into a roll while under its pressing heat and then without unwinding subjecting the roll to successive steaming and cooling operations.

11. The improvement in the art of treating cloth which consists in subjecting it to hot pressure between the opposed pressing surfaces of a cloth press, forming it into a roll while under its pressing heat and then without unwinding subjecting the roll successively to the passage through the cloth of currents of steam in opposite directions and then to the passage of a current of air.

12. The improvement in the art of treating cloth which consists in subjecting it to hot pressure between the opposed pressing surfaces of a cloth press, forming it into a roll while under its pressing heat and then, without unwinding, subjecting the roll to the passage of a current of steam passed through the cloth from the interior of the roll outward while applying a drying heat to the steam both just before and just after its passage through the cloth.

13. The improvement in the art of treating cloth which consists in subjecting it to hot pressure between the opposed pressing surfaces of a cloth press, forming it into a roll while under its pressing heat and then, without unwinding, subjecting the roll to the passage of a current of steam passed through the cloth from the interior of the roll outward while causing the steam to impinge upon a heated surface just before its passage through the cloth.

14. The improvement in the art of treating cloth which consists in subjecting the roll of cloth to a current of steam passed through the cloth from the exterior of the roll inward while at the same time subjecting the roll to heat from the interior of the roll outward.

15. The improvement in the art of treating cloth which consists in subjecting a roll of cloth to a current of steam passed through the cloth from the exterior of the roll inward while at the same time subjecting the roll to other heat applied both internally and externally.

16. The improvement in the art of treating cloth which consists in subjecting the same in the roll to currents of steam passed through the cloth successively in two directions while at the same time subjecting the roll to other heat applied both internally and externally.

17. The improvement in the art of treating cloth which consists in forming it in a roll in conjunction with a wet apron and then subjecting it to heat applied both internally and externally.

18. The improvement in the art of treating cloth which consists in subjecting it to hot pressing between the opposed pressing members of a cloth press and then winding the cloth while retaining its pressing heat upon a perforated cylinder whereby the cloth in the condition produced by rolling under its hot pressing heat is adapted for further treatment.

In testimony whereof, I have hereunto signed my name in the presence of two subscribing witnesses.

DAVID GESSNER.

Witnesses:
WALTER VAN COURT,
OLIN A. FOSTER.